US009001690B2

(12) United States Patent
Ji et al.

(10) Patent No.: US 9,001,690 B2
(45) Date of Patent: *Apr. 7, 2015

(54) ADAPTIVE GENERATION OF CHANNEL QUALITY INDICATORS (CQIS) BASED ON A CURRENT COMMUNICATION SCENARIO

(71) Applicant: Apple Inc., Cupertino, CA (US)

(72) Inventors: Zhu Ji, San Jose, CA (US); Navid Damji, Cupertino, CA (US); Johnson O. Sebeni, Fremont, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/270,883

(22) Filed: May 6, 2014

(65) Prior Publication Data

US 2014/0241196 A1    Aug. 28, 2014

Related U.S. Application Data

(63) Continuation of application No. 13/602,551, filed on Sep. 4, 2012, now Pat. No. 8,761,039.

(60) Provisional application No. 61/616,719, filed on Mar. 28, 2012.

(51) Int. Cl.
*H04W 24/08* (2009.01)
*H04B 7/06* (2006.01)
*H04L 1/00* (2006.01)
*H04M 1/00* (2006.01)
*H04W 72/12* (2009.01)
*H04W 88/02* (2009.01)

(52) U.S. Cl.
CPC ............ *H04W 24/08* (2013.01); *H04B 7/0632* (2013.01); *H04L 1/0026* (2013.01); *H04M 1/00* (2013.01); *H04B 7/063* (2013.01); *H04B 7/0639* (2013.01); *H04W 72/1226* (2013.01); *H04W 88/02* (2013.01)

(58) Field of Classification Search
USPC ......................................................... 370/252
See application file for complete search history.

(56) References Cited

U.S. PATENT DOCUMENTS

| 7,907,958 | B2 | 3/2011 | Sampath et al. |
| 8,144,797 | B2 | 3/2012 | Mujtaba et al. |
| 2010/0183064 | A1 | 7/2010 | Molnar et al. |
| 2010/0278058 | A1 | 11/2010 | Damnjanovic et al. |
| 2011/0189997 | A1 | 8/2011 | Tiwari et al. |
| 2011/0243017 | A1 | 10/2011 | Prasad et al. |
| 2011/0280197 | A1 | 11/2011 | Brueck et al. |
| 2012/0033722 | A1 | 2/2012 | Varadarajan et al. |

OTHER PUBLICATIONS

International Search Report and Written Opinion in application No. PCT/US2013/033525 mailed Aug. 29, 2013 pp. 1-8.
U.S. Appl. No. 13/602,551, filed Sep. 4, 2012, Zhu Ji.
International Preliminary Report on Patentability from PCT/US2013/033525, issued Oct. 9, 2014, pp. 1-5.

*Primary Examiner* — Melvin Marcelo
*Assistant Examiner* — Ellen A Kirillova
(74) *Attorney, Agent, or Firm* — Meyertons, Hood, Kivlin, Kowert & Goetzel, P.C.

(57) ABSTRACT

Adaptive generation of channel quality indicators based on a current communication scenario. A plurality of sets of channel quality indicator information may be stored for each of a plurality of UE communication scenarios. The information may be usable in generating a channel quality indicator. During operation of the UE, a current communication scenario of the UE may be determined. A first set of channel quality indicator information may be selected based on the determined current communication scenario being experienced by the UE. At least one channel quality indicator may be determined based on the selected first set of channel quality indicator information. Finally, the channel quality indicator may be provided to a base station.

18 Claims, 7 Drawing Sheets

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |
| 17 | 6 | 15 |
| 18 | 6 | 16 |
| 19 | 6 | 17 |
| 20 | 6 | 18 |
| 21 | 6 | 19 |
| 22 | 6 | 20 |
| 23 | 6 | 21 |
| 24 | 6 | 22 |
| 25 | 6 | 23 |
| 26 | 6 | 24 |
| 27 | 6 | 25 |
| 28 | 6 | 26 |
| 29 | 2 | Reserved |
| 30 | 4 | |
| 31 | 6 | |

*FIG. 6*

| CQI Index | Modulation | Code Rate x 1024 | Efficiency |
|---|---|---|---|
| 0 | Out of Range | | |
| 1 | QPSK | 78 | 0.1523 |
| 2 | QPSK | 120 | 0.2344 |
| 3 | QPSK | 193 | 0.3770 |
| 4 | QPSK | 308 | 0.6016 |
| 5 | QPSK | 449 | 0.8770 |
| 6 | QPSK | 602 | 1.1758 |
| 7 | 16QAM | 378 | 1.4766 |
| 8 | 16QAM | 490 | 1.9141 |
| 9 | 16QAM | 616 | 2.4063 |
| 10 | 64QAM | 466 | 2.7305 |
| 11 | 64QAM | 567 | 3.3223 |
| 12 | 64QAM | 666 | 3.9023 |
| 13 | 64QAM | 772 | 4.5234 |
| 14 | 64QAM | 873 | 5.1152 |
| 15 | 64QAM | 948 | 5.5547 |

*FIG. 8*

ADAPTIVE GENERATION OF CHANNEL QUALITY INDICATORS (CQIS) BASED ON A CURRENT COMMUNICATION SCENARIO

PRIORITY CLAIM

This application is a continuation application of U.S. patent application Ser. No. 13/602,551, filed Sep. 9, 2012, titled "Adaptive Generation of Channel Quality Indicators (CQIs) Based on a Current Communication Scenario", which claims benefit of priority to U.S. Provisional Application No. 61/616,719 titled "Adaptive Generation of Channel Quality Indicators (CQIs) Based on a Current Communication Scenario" and filed on Mar. 28, 2012, whose inventors are Zhu Ji, Navid Damji, Johnson O. Sebeni, both which are hereby incorporated by reference in their entirety as thought fully and completely set forth herein.

FIELD OF THE INVENTION

The present application relates to wireless devices, and more particularly to a system and method for adaptively generating and transmitting a channel quality indicator (CQI) based on a current communication scenario being experienced by the wireless device.

DESCRIPTION OF THE RELATED ART

Wireless communication systems are rapidly growing in usage. Further, wireless communication technology has evolved from voice-only communications to also include the transmission of data, such as Internet and multimedia content. Therefore, improvements are desired in wireless communication.

In order to provide improved communication between a base station (BS) and wireless user equipment (UE), the UE may calculate various metrics that indicate channel quality for feedback to the base station. Without loss of generality, these metrics may be referred to as channel quality indicators (CQIs). The base station can use these channel quality indicators to adjust its communication with the UE to provide improved communication with the UE. For example, these CQI metrics may be used by the BS to determine code rates and modulation scheme to be assigned to each UE. The code rates and modulation scheme may be selected not only to maximize the throughput to a particular UE, but also to improve the overall throughput of the base station communication area (e.g., the cell) through scheduling. The use of channel quality indicators thus allows the base station to more fully exploit the status of the wireless channel to improve communication throughput with various wireless user equipment (UE).

A Channel Quality Indicator (CQI) may be indicative of the communication quality of wireless channels. For example, a CQI can be a value (or values) representing a measure of channel quality for a given channel. Typically, a high value CQI is indicative of a channel with high quality, and a low value CQI is indicative of a channel with low quality. The UE generates various metrics for a channel based on its received downlink (DL) signals, and these metrics are used in determining the channel quality indicator for the channel. These metrics may include estimation of the spectral efficiency, the number of data layers, the pre-coding matrices in the scenarios of multiple input and multiple output (MIMO) antenna systems, etc. A CQI for a channel can be computed based on other performance metrics, such as a signal-to-noise ratio (SNR), signal-to-interference plus noise ratio (SINR), signal-to-noise plus distortion ratio (SNDR), and so forth of the channel.

The CQI for a given channel can also be dependent upon the transmission (modulation) scheme used by the communications system. For example, a communications system using code-division multiple access (CDMA) can make use of a different CQI than a communications system that makes use of orthogonal frequency division multiplexing (OFDM). In more complex communications systems, such as those making use of multiple-input multiple output (MIMO) and space-time coded systems, the CQI used can also be dependent on receiver type. Other factors that may be taken into account in generating a CQI are performance impairments, such as Doppler shift, channel estimation error, interference, and so forth. Therefore, in order to better reflect the true channel conditions, the CQI that is fed back to the base station may take into consideration multiple factors, including the receiver algorithms, DL channel configurations, MIMO configurations, and Doppler shift of the channels, among other factors.

The generation of channel quality indictors by the UE is important in optimizing use of the communication channel. Therefore, improvements are desired in the generation of CQIs in wireless communication systems.

SUMMARY OF THE INVENTION

Embodiments of the invention may relate to a system and method for adaptive generation of channel quality indicators (CQIs) based on a current communication scenario being experienced by the UE. More specifically, embodiments may relate to a method for providing an improved channel quality indicator (CQI) reporting process by utilizing a CQI adaptation procedure.

In one embodiment, the UE may be configured in an off-line process, e.g., at design time, to store a plurality of sets of communication scenario information for each of a plurality of UE communication scenarios. This may involve performing a CQI adaptation method for each of a plurality of UE communication scenarios to determine the plurality of sets of communication scenario information, wherein each set of communication scenario information corresponds to one of the UE communication scenarios. The sets of communication scenario information may comprise one or more mapping tables, such as: 1) a first mapping table for mapping signal to noise ratio to spectral efficiency (SNR-SE); 2) a second mapping table for mapping spectral efficiency to the channel quality indicator (SE-CQI); and/or 3) a third mapping table for directly mapping signal to noise ratio to channel quality indicator (SNR-CQI).

The determined sets of communication scenario information are then stored in the UE. Further, the UE is then configured to selectively utilize ones of the plurality of sets of communication scenario information in CQI generation based on current communication conditions of the UE. Thus, each set of communication scenario information is useable in generating a channel quality indicator for a respective communication scenario.

Each set of communication scenario information may be based on different combinations of one or more of receiver type, multiple input-multiple output (MIMO) scheme, and amount of Doppler shift, among others.

When the wireless user equipment (UE) is in use, the UE may operate as follows. The UE may determine a current communication scenario of the UE during operation of the UE. For example, the UE may determine its receiver type, the MIMO scheme used by the base station, and/or the amount of Doppler shift. The UE may then select a first set of communication scenario information based on the determined current communication scenario of the UE. The first set of communication scenario information may be selected from the stored plurality of sets of communication scenario information. The UE may then generate at least one channel quality indicator based on the selected first set of communication scenario information. Once the channel quality indicator has been generated, the UE may then transmit the channel quality indicator to the base station.

BRIEF DESCRIPTION OF THE DRAWINGS

A better understanding of the present invention can be obtained when the following detailed description of the embodiments is considered in conjunction with the following drawings.

FIG. 6 illustrates an exemplary table of modulation and coding schemes which is used in the CQI adaptation method of FIG. 5 according to one embodiment of the invention;

FIG. 8 illustrates an exemplary table of CQI values according to one embodiment of the invention.

Figure 1A:
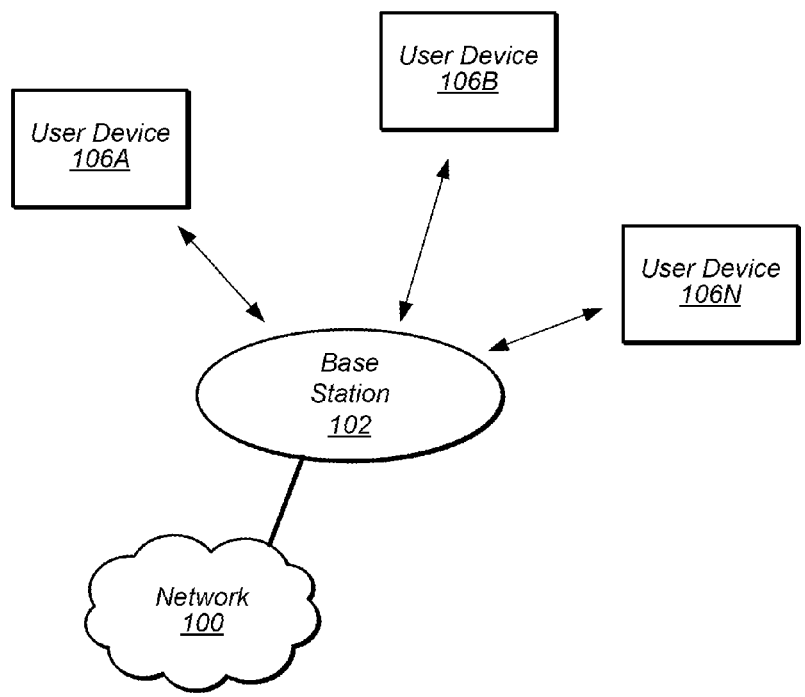
FIG. 1A illustrates an exemplary (and simplified) wireless communication system.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE EMBODIMENTS

Acronyms

The following acronyms are used in the present Provisional Patent Application:
BLER: Block Error Rate (same as Packet Error Rate)
BER: Bit Error Rate
CRC: Cyclic Redundancy Check
DL: Downlink
PER: Packet Error Rate
SINR: Signal to Interference-and-Noise Ratio
SIR: Signal to Interference Ratio
SNR: Signal to Noise Ratio
Tx: Transmission
UE: User Equipment
UL: Uplink
UMTS: Universal Mobile Telecommunication System

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1B:
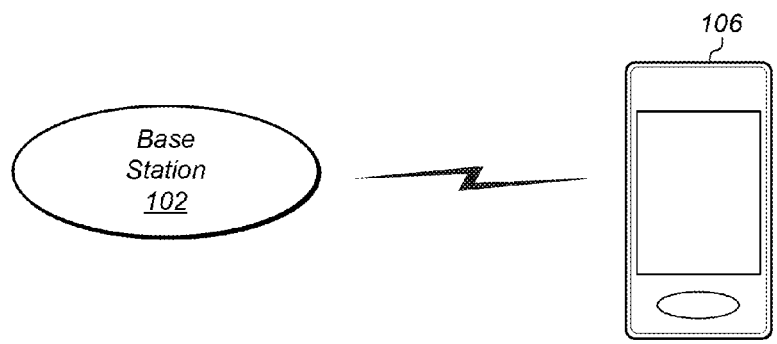
FIG. 1B illustrates a base station 102 in communication with user equipment 106.

FIGS. 1A and 1B—Communication System

FIG. 1A illustrates an exemplary (and simplified) wireless communication system. It is noted that the system of FIG. 1A is merely one example of a possible system, and embodiments of the invention may be implemented in any of various systems, as desired.

As shown, the exemplary wireless communication system includes a base station 102 which communicates over a transmission medium with one or more User Equipment (UE) (or "UE devices") 106A through 106N.

The base station 102 may be a base transceiver station (BTS) or cell site, and may include hardware that enables wireless communication with the UEs 106A through 106N. The base station 102 may also be equipped to communicate with a network 100. Thus, the base station 102 may facilitate communication between the UEs and/or between the UEs and the network 100. The communication area (or coverage area) of the base station may be referred to as a "cell." The base station 102 and the UEs may be configured to communicate over the transmission medium using any of various wireless communication technologies such as GSM, CDMA, WLL, WAN, WiFi, WiMAX, etc.

FIG. 1B illustrates UE 106 (e.g., one of the devices 106A through 106N) in communication with the base station 102. The UE 106 may be a device with wireless network connectivity such as a mobile phone, a hand-held device, a computer or a tablet, or virtually any type of wireless device. The UE 106 may include a processor that is configured to execute program instructions stored in memory. The UE may perform any of the embodiments described herein by executing such stored instructions. In some embodiments, the UE may include a programmable hardware element such as an FPGA (field-programmable gate array) that is configured to perform any of the method embodiments described herein, or any portion of any of the method embodiments described herein.

In some embodiments, the UE 106 may be configured to generate one or more channel quality indicators (CQIs) that are provided back to the base station 102. The base station 102 may use these CQIs received from one or more base stations to adjust its communications with the respective UE 106, or possibly other UEs 106. For example, in one embodiment the base station 102 may receive and utilize CQIs from multiple UEs 106 to adjust its communication scheduling among the various UEs within its coverage area (or cell).

User equipment (UE) 106 may use a CQI generation method as described herein to determine the CQI that is fed back to the base station (BS). In one embodiment, the generation of the CQI is performed based on a current communication scenario being experienced by the UE. As described below, during an off-line process, information (e.g., mapping tables) may be generated for different possible communication scenarios, and this information may be stored in the UE. Later, when the UE is actually in use (on-line), the UE may determine the current communication scenario that it is experiencing and select the pre-stored information (e.g., mapping tables) for use in generating the channel quality indicator (CQI).

Figure 2:
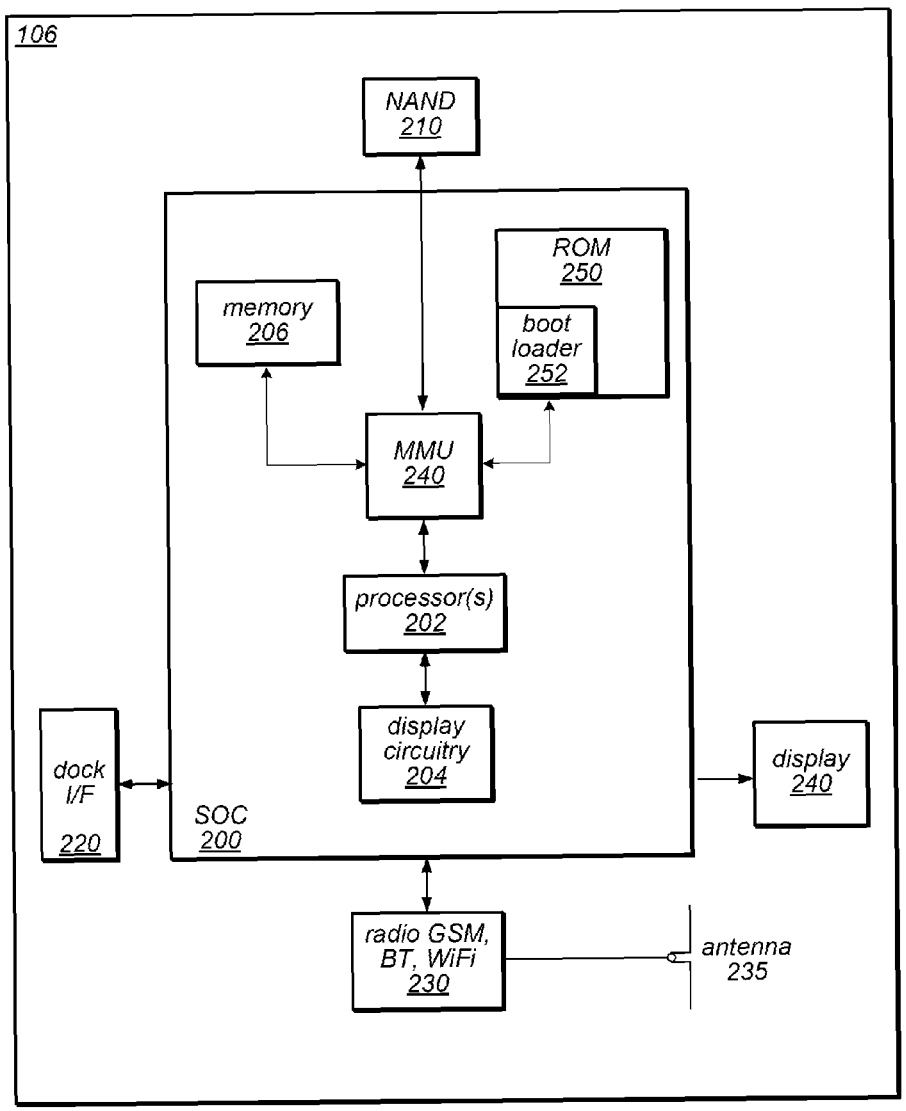
FIG. 2 illustrates an exemplary block diagram of a UE 106, according to one embodiment.

FIG. 2—Exemplary Block Diagram of a UE

FIG. 2 illustrates an exemplary block diagram of a UE 106. As shown, the UE 106 may include a system on chip (SOC) 200, which may include portions for various purposes. For example, as shown, the SOC 200 may include processor(s) 202 which may execute program instructions for the UE 106 and display circuitry 204 which may perform graphics processing and provide display signals to the display 240. The processor(s) 202 may also be coupled to memory management unit (MMU) 240, which may be configured to receive addresses from the processor(s) 202 and translate those addresses to locations in memory (e.g., memory 206, read only memory (ROM) 250, NAND flash memory 210) and/or to other circuits or devices, such as the display circuitry 204, radio 230, connector I/F 220, and/or display 240. The MMU 240 may be configured to perform memory protection and page table translation or set up. In some embodiments, the MMU 240 may be included as a portion of the processor(s) 202.

In the embodiment shown, ROM 250 may include a bootloader 252, which may be executed by the processor(s) 202 during boot up or initialization. As also shown, the SOC 200 may be coupled to various other circuits of the UE 106. For example, the UE 106 may include various types of memory (e.g., including NAND flash 210), a connector interface 220 (e.g., for coupling to the computer system), the display 240, and wireless communication circuitry (e.g., for GSM, Bluetooth, WiFi, etc.) which may use antenna 235 to perform the wireless communication. As described herein, the UE 106 may include hardware and software components for generating and/or providing CQI values to a base station.

Figure 3:
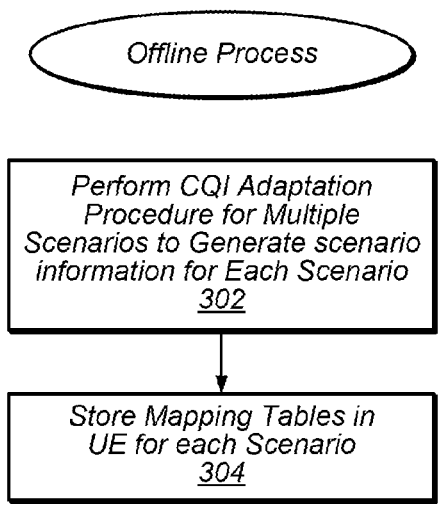
FIG. 3 illustrates an off-line process for generating mapping tables for different possible communication scenarios according to one embodiment of the invention.

FIG. 3—Offline Generation of Mapping Tables for Different Communication Scenarios FIG. 3 illustrates an off-line process for generating mapping tables for different possible communication scenarios according to one embodiment of the invention. The method shown in FIG. 3 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

As shown, in 302, a CQI adaptation procedure may be performed for multiple different communication scenarios to generate scenario information for each communication scenario (referred to as "scenarios" herein). The scenario information may be any information used to generate CQI(s) for that scenario. In one embodiment, the scenario information may include one or more mapping tables. The sets of communication scenario information may comprise one or more mapping tables, such as: 1) a first mapping table for mapping signal to noise ratio to spectral efficiency (SNR-SE); 2) a second mapping table for mapping spectral efficiency to the channel quality indicator (SE-CQI); and/or 3) a third mapping table for directly mapping signal to noise ratio to channel quality indicator (SNR-CQI).

Each set of communication scenario information may be based on different combinations of one or more of receiver type, multiple input-multiple output (MIMO) scheme, amount of Doppler shift, DownLink (DL) channel combinations, and wireless status, among others. In some embodiments, the scenario information may be based on various combinations or all of the above factors.

The various receiver types or algorithms may include Linear Minimum Mean Square Error (LMMSE), Maximum Likelihood Method (MLM), and Linear Minimum Mean Square Error with Serial Interference Cancellation (LMMSE-SIC), etc.

Additionally, the scenarios may correspond to different MIMO schemes or DL channel configurations. Accordingly, scenario information for determining CQI may be generated for different MIMO schemes and the pre-coding matrices therein, such as large-delay CDD (cyclic delay diversity), close-loop pre-coding matrices to exploit the channel capacity, spatial frequency or time block coding (SFBC or STBC) to exploit the channel diversity, etc.

Further, the scenarios may take into account different Doppler shifts. Note that the Doppler shift may determine the characteristics of time domain fading of wireless channels. Accordingly, the scenario information may incorporate the impact of Doppler shift to receiver performance and factor these impacts into mapping table(s). Additional scenarios may incorporate wireless channel status, among others.

Note that in some of the communication scenarios such as different MIMO and DL channel configurations, close-form analytical results can be derived. In other scenarios such as for receiver algorithms and channel Doppler effects, close-form estimation may not be available. Thus, in some embodiments, the UE may perform a CQI adaptation process as described herein to determine the appropriate CQI estimation or adjustment based on empirical data or calibration processes.

Exemplary details for 302 are provided below regarding FIG. 5.

In 304, the scenario information (e.g., the mapping tables) may be stored in one or more UEs. More specifically, the scenario information for each scenario that applies to each UE may be stored in a memory of the respective UE, e.g., in ROM 250, Flash memory 210, or copied to memory 206. In one embodiment, the applicable scenarios may be all of the scenarios used in 302. In other words, in this embodiment, all of the scenario information generated in 302 may be stored in each UE. Alternatively, only a subset of the sets of scenario information may be stored in each UE, depending on which scenarios apply to the UE. For example, if a UE does not support a particular scenario (e.g., if the UE does not have the appropriate hardware to support a particular scenario) then the corresponding scenario information may not be stored in the memory of the UE.

Note that while FIG. 3 is described as an offline process (e.g., performed during design or prior to manufacture of the UEs), it is possible that the process may alternatively, or in addition, be performed in an online manner, e.g., to update one or more of the previous scenario information to the current conditions. For example, where a particular scenario has been identified, the scenario information corresponding to the current scenario may be updated to reflect the specific current conditions rather than optimized or aggregate scenario information, such as generated by 302 above. Thus, the method of FIG. 3 may be augmented or even replaced with a similar online process, if desired.

The scenario information of 304 may be used in an online process for determining CQI(s), such as described regarding FIG. 4 below.

Figure 4:
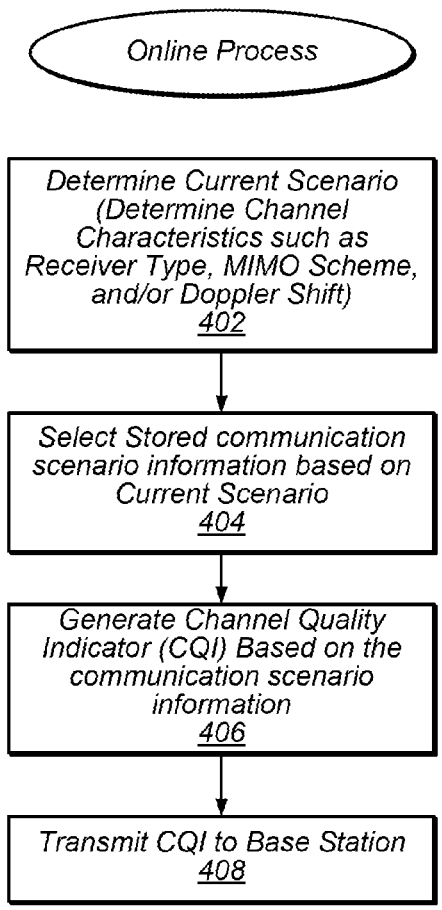
FIG. 4 illustrates an on-line process for generating a channel quality indicator based on a current communication scenario according to one embodiment of the invention.

FIG. 4—Generation of CQIs During UE Use

FIG. 4 illustrates an on-line process for generating a channel quality indicator based on a current communication scenario according to one embodiment of the invention. The method shown in FIG. 4 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

As shown, in 402, a current scenario may be determined, e.g., by the UE. For example, determining the current scenario may involve determining a current receiver type, MIMO scheme, and/or Doppler shift, among other possibilities. The information may be determined by performing measurements or by accessing current state data (e.g., stored in a local memory or received from another source, such as a BS), as desired. For example, the current MIMO scheme may be stored in a memory or register of the UE.

In 404, based on the current scenario, communication scenario information may be selected from the memory of the UE 106. More specifically, scenario information corresponding to the current scenario may be selected for generating current CQI(s). In one embodiment, as discussed above, the scenario information may include mapping table(s) that corresponds to the current receiver type, MIMO scheme, and/or Doppler shift, among other possible parameters. The scenario information may be used to determining CQIs for the current scenario being experienced by the UE 106.

Figure 7:
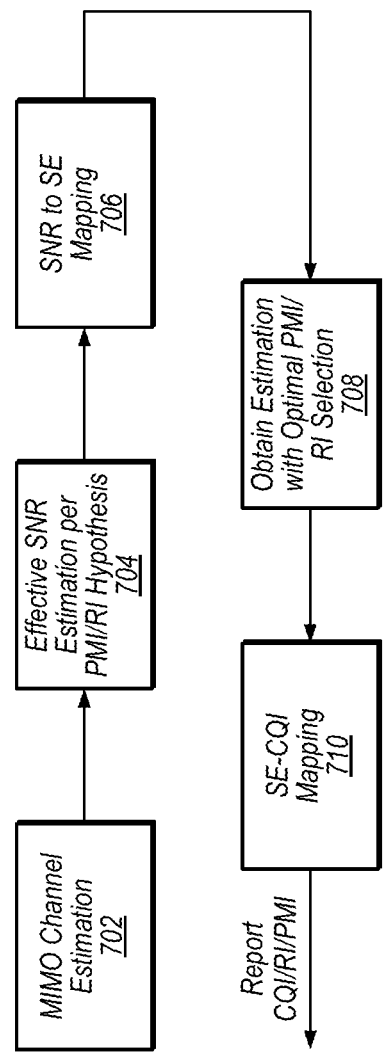
FIG. 7 illustrates an exemplary method for CQI calculation which uses mapping tables determined based on a current communications scenario according to one embodiment of the invention.

Accordingly, in 406, one or more CQIs may be generated using the selected communication scenario information of 404. The CQI may be generated based on current quality information as well as the selected communication scenario information. The quality information that is used in generating the CQI may be any of various measures, such as signal to noise ratio (SNR), spectral efficiency (SE), or other quality measures. For example, based on the current quality information, the one or more mapping tables corresponding to the current scenario may be used to determine one or more CQI values for provision to a base station. FIG. 7, described in more detail below, provides exemplary details corresponding to this method.

Finally, in 408, the generated CQI(s) may be provided to the base station. The base station may use this information for communicating with the UE in an effective manner, based on the current quality of the channel, indicating by the provided CQI(s).

Figure 5:
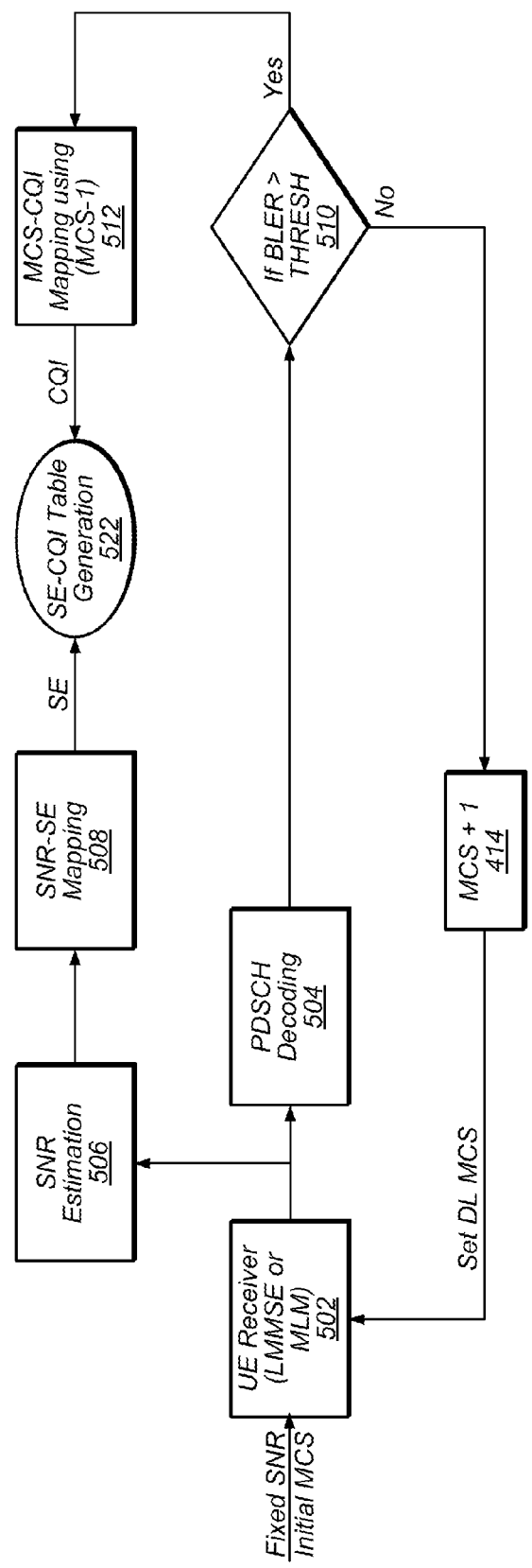
FIG. 5 illustrates a method for CQI adaptation which may be performed for different communication scenarios according to one embodiment of the invention.

FIG. 5—Generation of Scenario Information for Different Communication Scenarios

FIG. 5 illustrates a method for generating scenario information for different communication scenarios according to one embodiment of the invention. The process shown in FIG. 5 is an example of the method that may be performed in 302 of FIG. 3 for different communication scenarios. In this particular embodiment, the scenario information is generated as mapping tables, although other embodiments are envisioned. In one embodiment, the method of FIG. 5 is preferably performed off-line during design of the UE to generate information (e.g., mapping tables) that are pre-stored on the UE for later use during operation of the UE 106.

In this exemplary figure, the CQI adaptation procedure may be performed to generate proper SNR-SE and SE-CQI mapping tables for later use during operation of the UE. The use of different mapping tables for different communication scenarios allows the UE 106 to factor in the end-to-end receiver performance for CQI report and to meet the BLER target for each CQI.

Similar to methods discussed above, the method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. The CQI adaptation method may operate as follows.

In 502, the method may set the initial SNR and the initial MCS for the CQI adaptation. These values may be set by the UE and/or may be set by another device (e.g., testing equipment) and provided to the UE receiver. The initial SNR may be set at an initially low level, and as discussed below, may be increased over time to generate the mapping table(s). Similarly, the MCS may be set at a base level and may be increased over time to generate the mapping table(s).

FIG. 6 illustrates an exemplary MCS table illustrating an increasing set of schemes which may be used in the method of FIG. 4, although other MCS values and schemes are envisioned. As shown, the MCS table includes an index column, a modulation order column, and a total block size index column.

Additionally, in 502, for the current fixed SNR with an initial MCS, the method (e.g., the UE receiver) may perform DL demodulation with the selected receiver algorithm (e.g., LMMSE, MLM, etc.).

In 504, the PDSCH decoding may be performed. Additionally, after decoding, the CRC may be checked to see if the transport block is correctly decoded or not.

In 510, the method measures the BLER level of the PDSCH decoding to determine if the BLER target or threshold (shown as "THRESH") is achieved or not. In some embodiments, an exemplary value of the BLER target is 10%, although of course other values can be used. In the scenarios of fast changing wireless channels such as with high Doppler shifts, the BLER target threshold can be as large as 30%, among other possibilities.

If the BLER is determined to be less than or equal to the BLER target, the MCS may be increased by 1 in 514 and the method may be repeated from 502 using the new MCS value.

If the measured BLER is more than the BLER target, then the method may advance to 512.

In 512, the method may obtain the CQI that maps to MCS-1 for the mapping table. Additionally, in 506 and 508, the method may calculate the spectral efficiency corresponding to the MCS-1 for the given SNR. The method then generates (e.g., adds to) the CQI-SE mapping table using the determined CQI and SE in 522

Finally, the SNR may be increased and the method may be repeated for the new SNR value, until the CQI-SE mapping table is completed.

FIG. 7—Exemplary CQI Calculations

FIG. 7 illustrates embodiments of a method for generating channel quality indicators according to one embodiment of the invention. The method of FIG. 7 may generate a CQI that is based on the current communication scenario that is being experienced by the UE 106. More specifically, the method of FIG. 7 may be used once the current scenario (and accordingly the appropriate scenario information, such as mapping tables) is selected. Thus, the method of FIG. 7 may be used for any number of different communication scenarios. In one embodiment, the process shown in FIG. 7 is an example of the method that may be performed in 406 of FIG. 4. The method of FIG. 7 may be preferably performed on-line, i.e., during use or operation of the UE.

Moreover, the method shown in FIG. 7 may be used in conjunction with any of the computer systems or devices shown in the above Figures, among other devices. In various embodiments, some of the method elements shown may be performed concurrently, in a different order than shown, or may be omitted. Additional method elements may also be performed as desired.

As shown, the method of FIG. 7 may operate as follows.

In 702, MIMO channel estimation and/or noise estimation may be performed. In one embodiment, the channel estimation may be used to generate a whitened channel estimation matrix for CQI calculation.

In 704, effective SNR estimation per PMI/RI Hypothesis may be determined. In one embodiment, the SNR estimation may be based on the whitened channel estimation and the receiver algorithm (e.g., LMMSE, MLM, LMMSE-SIC, among other possibilities).

In 706, an SNR to SE mapping may be performed, e.g., using a SNR to SE mapping table. As discussed above, the SNR-SE mapping table may be generated by an adaptive CQI method described in FIGS. 3 and 5. The SNR-SE mapping table may be selected based on the current communication scenario as noted above. The SNR to SE mapping may consider the channel capacity as well as the possible loss due to practical receivers. Note that the SE estimation can be done in a finer granularity on a small number of resource blocks (e.g., two RBs). In one embodiment, the SE may be further processed, e.g., involving averaging across wideband, filtered over time, etc.

In 708, an estimation with the optimal PMI/RI (precoding matrix index/rank index) selection may be performed. The PMI/RI may be related to MIMO transmissions and may indicate the number of layers of transmission in MIMO scenarios. In one embodiment, the UE can use its channel estimation to determine the best PMI & RI and feedback to eNB for it to apply at the eNB side. In general, these values may be calculated along with CQIs, and conceptually, they are all part of channel quality feedback. In the context of LTE, the channel quality feedback may report CQI, PMI and RI separately.

In 710, SE to CQI mapping may be performed to determine the CQI, e.g., using an SE-CQI mapping table. As discussed above, the SE-CQI mapping table may be generated by an adaptive CQI method described in FIGS. 3 and 5. The SE-CQI mapping table may be selected based on the current communication scenario as noted above. The CQI and/or RI/PMI values may then be reported. Note that CQIs may include any of various channel quality feedback indications. For example, the term "CQI" may generally include RI/PMI values as well as the channel quality for eNB to select a proper code rate (MCS). Thus, discussions above regarding CQI may include one or more values, including RI/PMI values. In this specific instance, the channel quality, RI, and PMI values are provided.

FIG. 8 provides an exemplary embodiment of a CQI mapping table, e.g., following an LTE embodiment.

Advantages

Exemplary advantages of the CQI adaptation described above include the ability to capture the CQI estimation losses that cannot be obtained from analytical results, especially for the scenarios or algorithms that do not have close-form analytical results. For example, using the MLM method or simplified MLM method such as Max-Log-MAP simplification or QR decomposition to separate the bitstreams, it is difficult to obtain accurate estimation of the effective SNR or decoding performance that can be achieved. The CQI adaptation procedure can be performed to calibrate the MLM receive performance and reflect it in the mapping tables for CQI calculation, such as the CQI-SE mapping table or SNR-SE mapping table.

LTE CQI Fundamentals

As noted above, the embodiments described herein are in the exemplary context of an LTE communication system. The following provides more specific implementation details for one exemplary LTE embodiment.

In LTE, the channel quality indicators (CQI) may be defined as follows. Based on an unrestricted observation interval in time and frequency, the UE derives for each CQI value reported in uplink subframe n the highest CQI index between 1 and 15 in the table of FIG. 8 which satisfies the following condition, or CQI index 0 if CQI index 1 does not satisfy the condition: A single Physical Downlink Shared Channel (PDSCH) transport block with a combination of modulation scheme and transport block size corresponding to the CQI index, and occupying a group of downlink physical resources blocks termed the CQI reference resource, could be received with a transport block error probability not exceeding 0.1.

In LTE, the modulation and coding schemes (MCS) are defined to allow different levels of coding rates and modulation orders such as in the table of FIG. 6 for DL physical downlink shared channel (PDSCH). The Transport Block Size (TBS) index is used in transport block size tables defined in the table of FIG. 8.

Based on the description of the CQI definition for LTE, in one embodiment it may be desirable for the UE to achieve the 10% block error rate (BLER) target for any CQI given the DL configuration defined in the table of FIG. 8. Also, the scheduling algorithm in BS can be designed according to this exemplary UE requirement to improve the throughput. Note that what is proposed in the LTE specification is one way of reporting and using CQI for optimizing the receiver throughput, which sets a fixed BLER target for the UE that can simplify the optimization at the BS. However, in order to further improve performance, an adaptive BLER target can be used based on the UE channel conditions and network scenarios. Note that the present embodiment is directed to improving the fixed BLER target for CQI. However, the methods described herein can be used in various BLER targets for CQI.

Further Embodiments

Note that in the present description, various embodiments are described in the context of LTE (Long-term evolution of UTMS). However, it is noted that the methods described herein can be generalized for CQI reporting using other wireless technologies and are not limited to the specific descriptions provided above.

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A user equipment (UE) device, the UE device comprising:
   an antenna for performing wireless communications with a base station;
   a memory which stores a plurality of sets of communication scenario information for each of a plurality of UE communication scenarios, wherein each set of communication scenario information is useable in generating a channel quality indicator for a respective communication scenario;
   a processor configured to:
      determine a current communication scenario of the UE device during operation of the UE;
      select a first set of communication scenario information from the plurality of sets of communication scenario information based on the determined current communication scenario of the UE device;
      determine a current channel estimation for the UE device; and
      generate at least one channel quality indicator based on the selected first set of communication scenario information and the current channel estimation, wherein the current channel estimation is used to generate the channel quality indicator for each of the plurality of UE communication scenarios;
   wherein the UE device is configured to transmit the channel quality indicator to a base station.

2. The UE device of claim 1, wherein each of the stored plurality of sets of communication scenario information is based on one or more of receiver type, multiple input-multiple output (MIMO) scheme, and amount of Doppler shift.

3. The UE device of claim 1, wherein each of the stored plurality of sets of communication scenario information is based on two or more of receiver type, multiple input-multiple output (MIMO) scheme, and amount of Doppler shift.

4. The UE device of claim 1,
wherein each of the stored plurality of sets of communication scenario information is based on receiver type, multiple input-multiple output (MIMO) scheme, and amount of Doppler shift;
wherein said determining the current communication scenario of the UE comprises determining a receiver type of the UE, a MIMO scheme used by the base station, and the amount of Doppler shift experienced by the UE.

5. The UE device of claim 1,
wherein each of the stored plurality of sets of communication scenario information comprises one or more mapping tables for mapping spectral efficiency to the channel quality indicator.

6. The UE device of claim 1,
wherein each of the stored plurality of sets of communication scenario information comprises at least: 1) a first mapping table for mapping signal to noise ratio to spectral efficiency and 2) a second mapping table for mapping spectral efficiency to the channel quality indicator.

7. A method performed by wireless user equipment (UE), the method comprising:
determining a current communication scenario of the UE during operation of the UE;
selecting a first set of communication scenario information based on the determined current communication scenario of the UE, wherein the first set of communication scenario information is selected from a stored plurality of sets of communication scenario information, wherein each set of communication scenario information corresponds to a respective UE communication scenario;
determining a current channel estimation for the UE;
generating at least one channel quality indicator based on the selected first set of communication scenario information and based on the current channel estimation for the UE, wherein the current channel estimation is used to generate the channel quality indicator for each of the communication scenarios; and
transmitting the channel quality indicator to a base station.

8. The method of claim 7, wherein each of the stored plurality of sets of communication scenario information is based on one or more of receiver type, multiple input-multiple output (MIMO) scheme, and amount of Doppler shift.

9. The method of claim 7, wherein each of the stored plurality of sets of communication scenario information is based on two or more of receiver type, multiple input-multiple output (MIMO) scheme, and amount of Doppler shift.

10. The method of claim 7,
wherein each of the stored plurality of sets of communication scenario information is based on receiver type, multiple input-multiple output (MIMO) scheme, and amount of Doppler shift;
wherein said determining the current communication scenario of the UE comprises determining a receiver type of the UE, a MIMO scheme used by the base station, and the amount of Doppler shift experienced by the UE.

11. The method of claim 7,
wherein each of the stored plurality of sets of communication scenario information comprises one or more mapping tables for mapping spectral efficiency to the channel quality indicator.

12. The method of claim 7,
wherein each of the stored plurality of sets of communication scenario information comprises at least: 1) a first mapping table for mapping signal to noise ratio to spectral efficiency and 2) a second mapping table for mapping spectral efficiency to the channel quality indicator.

13. A non-transitory computer-accessible memory medium storing program instructions, wherein the program instructions, when executed by a computer system, cause the computer system to:
determine a current communication scenario of a user equipment (UE) the UE during operation of the UE;
select a first set of communication scenario information based on the determined current communication scenario of the UE, wherein the first set of communication scenario information is selected from a stored plurality of sets of communication scenario information, wherein each set of communication scenario information corresponds to a respective UE communication scenario;
determine a current channel estimation for the UE; and
generate at least one channel quality indicator based on the selected first set of communication scenario information and based on the current channel estimation for the UE, wherein the current channel estimation is used to generate the channel quality indicator for each of the communication scenarios;
wherein the channel quality indicator is configured to be transmitted to a base station.

14. The non-transitory computer-accessible memory medium of claim 13,
wherein each of the stored plurality of sets of communication scenario information is based on one or more of receiver type, multiple input-multiple output (MIMO) scheme, and amount of Doppler shift.

15. The non-transitory computer-accessible memory medium of claim 13,
wherein each of the stored plurality of sets of communication scenario information is based on two or more of receiver type, multiple input-multiple output (MIMO) scheme, and amount of Doppler shift.

16. The non-transitory computer-accessible memory medium of claim 13,
wherein each of the stored plurality of sets of communication scenario information is based on receiver type, multiple input-multiple output (MIMO) scheme, and amount of Doppler shift;
wherein selecting the first set of communication scenario information comprises determining a receiver type of the UE, a MIMO scheme used by the base station, and the amount of Doppler shift experienced by the UE.

17. The non-transitory computer-accessible memory medium of claim 13,
wherein each of the stored plurality of sets of communication scenario information comprises one or more mapping tables for mapping spectral efficiency to the channel quality indicator.

18. The non-transitory computer-accessible memory medium of claim 13,
wherein each of the stored plurality of sets of communication scenario information comprises at least: 1) a first mapping table for mapping signal to noise ratio to spectral efficiency and 2) a second mapping table for mapping spectral efficiency to the channel quality indicator.

* * * * *

UNITED STATES PATENT AND TRADEMARK OFFICE
CERTIFICATE OF CORRECTION

PATENT NO. : 9,001,690 B2  Page 1 of 1
APPLICATION NO. : 14/270883
DATED : April 7, 2015
INVENTOR(S) : Zhu Ji et al.

It is certified that error appears in the above-identified patent and that said Letters Patent is hereby corrected as shown below:

In the Claims:

Claim 13, Column 14, Line 12, please delete "(UE) the UE" and substitute -- (UE) --

Signed and Sealed this
Twenty-seventh Day of October, 2015

Michelle K. Lee
*Director of the United States Patent and Trademark Office*